A. G. PERRY.
Improvement in Combined Planter and Cultivator.

No. 131,969. Patented Oct. 8, 1872.

Witnesses.
Geo. N. Howard.
H. A. Daniels

Aloy Green Perry, Inventor,
C. S. Whitman. Attorney

UNITED STATES PATENT OFFICE.

ALVY G. PERRY, OF UNION COUNTY, MISSISSIPPI.

IMPROVEMENT IN COMBINED PLANTERS AND CULTIVATORS.

Specification forming part of Letters Patent No. 131,969, dated October 8, 1872.

*To all whom it may concern:*

Be it known that I, ALVY G. PERRY, of the county of Union and State of Mississippi, have invented an Improved Cultivator Plow and Planter; and do hereby declare that the following description, taken in connection with the accompanying plate of drawing hereinafter referred to, forms a full and exact specification of the same, wherein I have set forth the nature and principles of my said improvement, by which my invention may be distinguished from others of a similar class, together with such parts as I claim and desire to secure by Letters Patent.

My invention relates to that class of agricultural implements which may be used either as cultivators or planters; and the nature thereof consists in certain modifications in the details of the construction of the same, hereinafter described and shown.

In the accompanying plate of drawing, which illustrates my invention and forms a part of the specification thereof—

Figure 1:
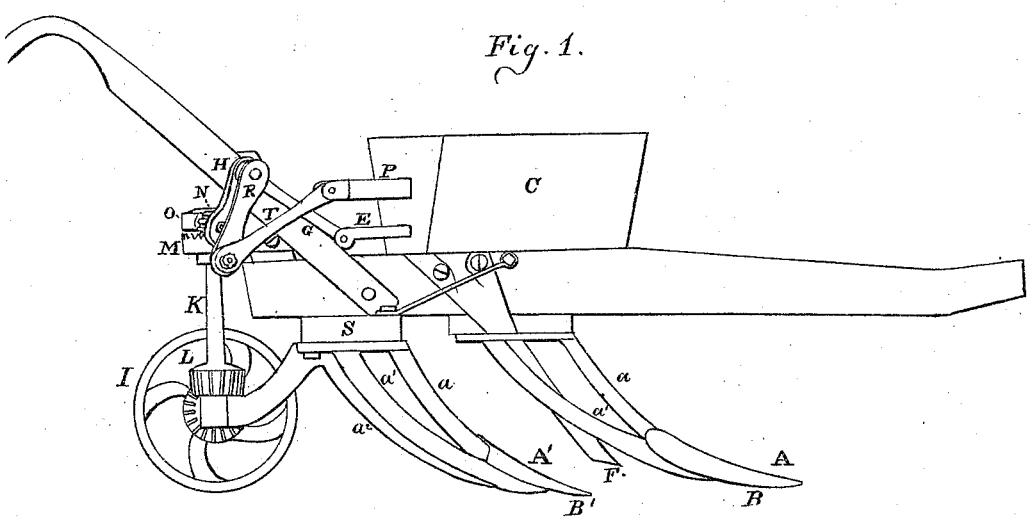
Figure 2:
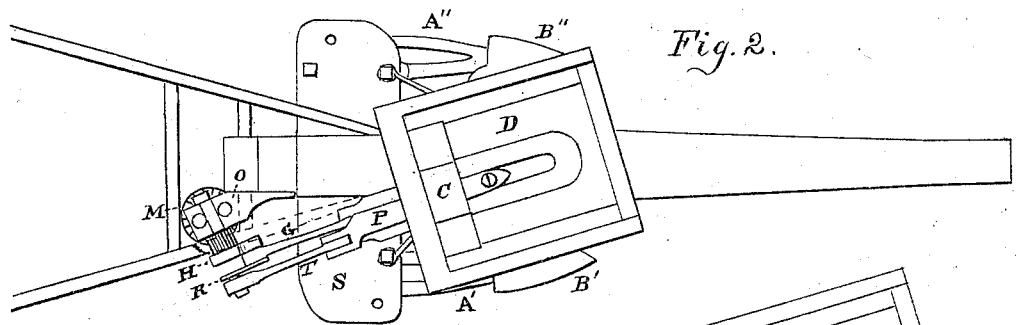
Figure 3:
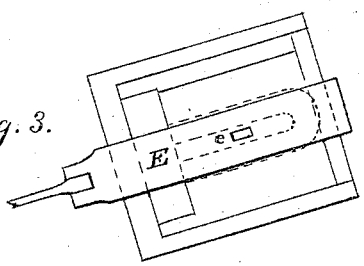

Figure 1 is a side view of the implement; Fig. 2, a plan view thereof; Fig. 3 is a plan view of the reciprocating slide; and Fig. 4 illustrates the position of the parts when the implement is used as a cultivator.

The construction, operation, and relative arrangement of the component parts of my invention are described as follows:

In the drawing referred to, A A' A'' designate standards, each of which consists of the three parts $a$ $a'$ $a''$, coming to a point at and bolted to the shovel-shaped shares B B' B''. The said parts diverge upwardly, and are secured to the frame, as shown. C designates the hopper secured in a diagonal position to the beam. The bottom of the hopper is provided with a false bottom, D, in which is cut a sloping aperture, through which the corn descends beneath the said sloping aperture; and between the false bottom D and the bottom of the hopper is the reciprocating slide E, provided with an aperture, $e$, of a sufficient width to admit a single kernel of corn. The sides of the said aperture slope outward in order that kernels of corn which fall into it may not be forced out. The slide reciprocates backward and forward, causing the said apertures $e$ to come at each return motion over the hose or spout F, through which the corn passes and is conducted to the ground. The said slide is reciprocated by means of the pitman G, operated by the crank H. Rotary motion is imparted to the said crank by means of the wheel I, upright shaft K provided with the bevel-gear L and crown-wheel M, which engages with the pinion N supported by the bracket O. P designates a reciprocating shaft made use of for the purpose of stirring the corn in the hopper. The said shaft is operated by the crank R, and connecting-rod T.

Figure 4:
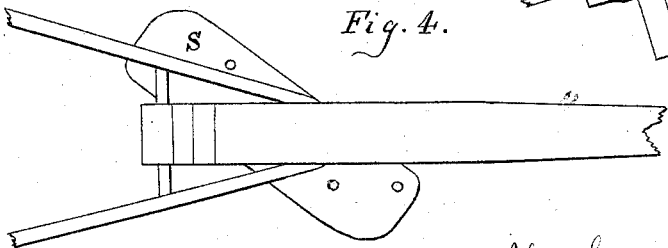

The plow may be used as a cultivator by simply removing those parts which are used for the purpose of planting, and causing the cross-piece S and standards A A' to assume the position shown in Fig. 4.

Having described my invention, I will state what I claim and desire to secure by Letters Patent in the following clause—that is to say:

I claim—

The mechanism made use of for operating the shaft P and reciprocating slide E, consisting of the combination of the wheel I, shaft K provided with the bevel-gear L and crown-wheel M, pinion N, crank H, connecting-rod G, crank R, and connecting-rod T, all operating together as and for the purposes described.

In witness that I claim the foregoing I have subscribed my name hereto this 16th day of December, 1871.

ALVY GREEN PERRY.

Witnesses:
J. M. MANN,
Y. Y. BAKER.